United States Patent [19]

Siol et al.

[11] Patent Number: 5,523,168
[45] Date of Patent: Jun. 4, 1996

[54] TRANSPARENT COMPOSITE PLATE SYSTEM

[75] Inventors: Werner Siol, Darmstadt; Klaus Koralweski, Riedstadt; Hans Lorenz, Darmstadt; Michael Meier-Kaiser, Pfungstadt, all of Germany

[73] Assignee: Röhm GmbH Chemische Fabrik, Darmstadt, Germany

[21] Appl. No.: 185,250

[22] Filed: Jan. 24, 1994

[30] Foreign Application Priority Data

Jan. 23, 1993 [DE] Germany .......................... 43 01 848.3

[51] Int. Cl.$^6$ ................................................ B32B 27/08
[52] U.S. Cl. .......................... 428/520; 428/522; 428/523
[58] Field of Search ................................. 428/520, 522, 428/523

[56] References Cited

U.S. PATENT DOCUMENTS

| | | | |
|---|---|---|---|
| 5,028,677 | 7/1991 | Janowicz | 526/329.7 |
| 5,053,461 | 10/1991 | Tone et al. | 525/244 |
| 5,155,172 | 10/1992 | Siol et al. | 525/308 |

FOREIGN PATENT DOCUMENTS

| | | |
|---|---|---|
| 0138083 | 9/1984 | European Pat. Off. . |
| 0419166A2 | 9/1990 | European Pat. Off. . |
| 0510927A2 | 4/1992 | European Pat. Off. . |
| 3902653 | 8/1990 | Germany . |
| 53-2576 | 1/1978 | Japan . |
| 57-140161 | 8/1982 | Japan . |

OTHER PUBLICATIONS

*Handbook of Composites, Sandwich Construction*, A. Marshall, Van Nostrand Reinhold Company (no mo/y).
Chemical Abstracts, vol. 105, No. 18, Nov. 3, 1986, AN 154387e and JP-A-61-132 343, Jun. 19, 1986.
Chem. Abstract, vol. 105, 105: 154387e, 1986.

*Primary Examiner*—Mark D. Sweet
*Attorney, Agent, or Firm*—Oblon, Spivak, McClelland, Maier & Neustadt

[57] ABSTRACT

The invention relates to transparent composite plate systems of a) at least two acrylic glass exterior plates S, S' with a thickness of at least 2 mm and parallel surfaces, and b) an intermediate layer Z containing a thermoplastically processable elastomer E, whereby the elastomer E contains from 60–100% by weight of a comb polymer KP, which itself contains from 50 to 5% by weight of at least one polymethyl methacrylate macromonomer of Formula I $$R-(CH_2-\underset{\underset{COOCH_3}{|}}{\overset{\overset{CH_3}{|}}{C}})_n-H \quad (I)$$

and from 95 to 50% by weight of alkyl acrylates of Formula II $$CH_2=\underset{\underset{H}{|}}{\overset{\overset{O}{\|}}{C}}-COR_4$$

wherein R and $R_4$ are defined in the claims.

6 Claims, No Drawings

TRANSPARENT COMPOSITE PLATE SYSTEM

BACKGROUND OF THE INVENTION

1. Field of the Invention

The invention relates to a transparent composite system comprising polymethyl methacrylate (PMMA) plates and an intermediate layer of an elastomeric resin.

2. Discussion of the Background

Polymethyl methacrylate, and copolymers of methyl methacrylate, exhibit characteristics which are desirable for glazing materials: particularly high transparency and good weather resistance, and—in comparison with silicate glass—a lower weight. But these advantageous, optical characteristics of PMMA and its copolymers are diminished by the brittleness of these materials. This brittleness exhibits itself in the splintering off of shards or parts of the PMMA when it undergoes mechanical stress.

This intrinsic brittleness of PMMA (in addition to its poor scratch resistance and its flammability) naturally reduces its application, especially as a construction material or in areas of high traffic or public use. Several attempts to eliminate these disadvantages have been reported. (see H. Rauch-Puntigam, Th. Völker, Acryl- und Methacrylverbindungen, Springer-Verlag 1967, p. 291).

For example, German Patent Application 29 14 223 recommends, e.g. a clear, transparent synthetic resin composite plate consisting of a clear, transparent plastic base plate with a thickness of at least 1 mm and with parallel surfaces, at least one clear, transparent plastic foil with a scratch resistance not less than that of the base plate, and at least one clear, transparent adhesive resin layer positioned between the base plate and plastic foil, which adheres to the foil in fixed manner and which can be pulled off the base plate.

Japanese Application 61 132 343 (Chem. Abstr. 105, 154387e) discloses an acrylic glass laminate consisting of two exterior hard plastic plates and an intermediate plate of soft plastic with an electrically conductive layer on or near the surface. The intermediate layer is, e.g., an MMA-methacrylate-elastomer equipped on both sides with an antistatic agent and an acrylate adhesive.

German Application 31 28 985 discloses laminated, thermoplastic objects. The laminates are obtained by joining at least one PMMA film with at least one impact-resistant methacrylate polymer by calendaring.

European Patent 419 166 describes co-extruded multilayer webs consisting of a complex configuration of individual layers with a thickness of 0.3 to 6 mm each. The first exterior layer consists of a blend of polyvinylidene fluoride with $M_n < 250,000$, 30–60% by weight C1–C8 alkyl methacrylate with $M_n \leq 150,000$, and possibly 10–30% by weight of a graft elastomer of C1–C8 alkyl acrylate, grafted and cross-linked with allylmethacrylate, as well as at least one second layer of an alkyl methacrylate homopolymer or copolymer. The co-extrusion is performed through a multiple extrusion nozzle.

There are also papers on laminates from different plastics. Illinger et al. in Polym. Sci. Technol. 1975, 9A (Adhes. Sci. Technol) 217–232, e.g., proposes laminates of acrylate-polyurethane-polycarbonate for the protection of windshields, whereby it is emphasized that the impact resistance and the optical clarity of the laminates depend on the chemical composition of the intermediate adhesion layer. European Patent Application 138 083 proposes polymer mixtures as an intermediate adhesion layer for laminates, said intermediate adhesion layers consisting of copolymers of firstly 81–99 weight parts olefin and unsaturated carboxylic acids and secondly of 1–19 weight parts thermoplastic elastomers, whereby the former are present dispersed as particles. The use of fiber inserts, particularly glass and carbon fiber inserts, has also been considered in attempting to improve the splintering safety of thermoplasts, such as acrylic glasses (cf. European Patent 0 510 927).

SUMMARY OF THE INVENTION

Applicants have now discovered that a transparent plate composite system comprising a) at least two, preferably clear, (i.e., non-tinted) transparent acrylic exterior plates S and S' each with a thickness of at least 2 mm and having their surfaces parallel to one another, and b) an intermediate layer Z containing a thermoplastically processable elastomer E fulfills the technological requirements for glazings very well. According to the invention, the elastomers E are comb polymers made from one or more polymethyl methacrylate (PMMA) macromonomers and one or more alkyl acrylates, particularly butyl acrylate. The intermediate layer Z provides, among other things, the adhesive, interfacial connection between the two exterior PMMA plates S and S'. The exterior acrylic plates S and S' may have any thickness, but due to practical aspects they will rarely exceed 50 mm, preferably 30 mm. The layer thickness of the intermediate layer Z is also only limited by practical aspects. It generally ranges from 0.05 to 5 mm, preferably from 0.1 to 3 mm. The other dimensions of the transparent composite plate system are also only a result of practical considerations. The exterior plates S/S' are easily produced with dimensions up to 10 m. Since the transparent composite system can be processed mechanically in any standard manner, its production is not tied to compliance with exact application dimensions; it may, however, be advantageous to use predefined dimensions for certain applications.

The acrylic plates S and S' preferably consist of any known or commercially available PMMA or any known transparent copolymers of methyl methacrylate, possibly suitably modified, e.g. cross-linked, with known stabilizers or other additives, e.g. with a flame-retarding or antistatic treatment. The methyl methacrylate copolymers preferably contain 80–100% by weight of methyl methacrylate. The acrylic glass plates also can be tinted in any known manner. They also can be equipped with a scratch-resistant coating, usually on their exposed surfaces (cf. Ullmann's Encyclopedia of Industrial Chemistry 5th Ed., Vol. A20, 459–507, VCH 1992).

Suitable materials for the acrylic plate(s) S and/or S' are the so-called cast materials, band materials, or extruded materials. (Cf. H. F. Mark et al. Encyclopedia of Polymer Science & Engineering. 2nd Ed. Vol. 1, 276–278, J. Wiley 1985).

The intermediate layer Z consists either entirely or partially of elastomers E. The elastomers E comprise from 60 to 100% by weight of one or more comb polymers KP, which themselves consist of from 50–5% by weight of one or more polymethyl methacrylate macromonomers of Formula I below, and 50–95% by weight of one or more alkyl acrylates of Formula II below. Such comb polymers are described e.g. in German Application 39 02 653 or German Application 41 21 811, or U.S. Pat. No. 5,028,677, all incorporated herein by reference.

The comb polymers KP are prepared by copolymerization of at least one macromonomer of Formula I

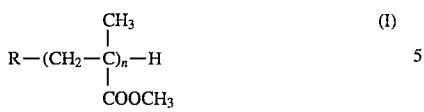

where R is any radically polymerizable terminal group and n is chosen such that the molecular weight of the macromonomers ranges from 500–100,000 Daltons with at least one alkyl acrylate monomer of Formula II (see below). n preferably is a number from 10 to 1,000.

R is preferably a group of the Formula III

wherein $R_1$ is hydrogen or methyl, and where Q is a bifunctional residue chosen from the group

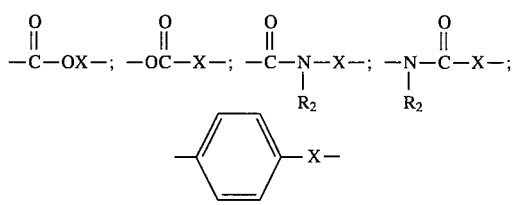

where $R_2$ is hydrogen or an alkyl residue with 1 to 24 carbon atoms, preferably 1 to 6 carbon atoms, and X is an alkylene residue with 2 to 24 carbon atoms (e.g., —$CH_2$—$CH_2$—), preferably an alkylene residue containing at least one oxygen, sulfur or nitrogen atom which is preferably bonded directly to the $(CH_2$—$C)_m$ chain of Formula (1).

Especially preferred X groups are chosen from the formulas

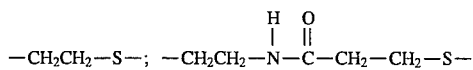

R may also be a group of Formula IV

where $R_3$ is an alkyl residue of 1 to 4 carbons, preferably methyl.

The alkyl acrylate comonomers of Formula (II) which form the comb polymers KP are

where $R_4$ stands for $C_2$-$C_{20}$-alkyl, especially ethyl, n-butyl, iso-butyl, 2-ethylhexyl, and, especially preferred, n-butyl. The molecular weight of the comb polymers KP ranges from 50,000 to 2,000,000, preferably 100,000 to 800,000 Dalton.

All the molecular weights referred to above are weight average molecular weights (Mw) determined by SEC (Size Exclusion Chromatography; cf. H. F. Mark et at. Encyclopedia of Polymer Science and Engineering, 2nd Ed. Vol. 10, pp. 1–19, J. Wiley & Sons 1967).

To the extent that the elastomer E contains, in addition to at least one comb polymer KP, 0–40% by weight of another polymer component, this component is preferably an unconverted (i.e., unpolymerized) residual macromonomer of Formula I and/or a polymethyl methacrylate derived from I which does not contain a radically polymerizable group, (i.e., a vinyl group) and is thus no longer a reactive macromonomer.

When the macromonomer is synthesized on an industrial scale, this component may occur as secondary products, e.g. in concentrations from 0.1 to 40, particularly 0.5 to 20% by weight, and thus provide elastomer E with approximately these concentrations.

A preferred process for producing comb polymers KP is the radically initiated polymerization of macromonomers of Formula I with the alkyl acrylates of Formula II, preferably in a weight ratio of 20–50 to 80–50. The polymerization is performed as a mass polymerization or preferably solvent polymerization, e.g. in an ester such as butyl acetate or in toluene, and under an inert protective gas, e.g. argon, in a reactor equipped with a protective gas supply and an agitation resistance meter by using radical initiators, such as e.g. a per-compound, e.g. a per-ester, such as tert.-butyl-perneodecanoate in amounts from 0.005 to 0.5% by weight, particularly approximately 0.1% by weight. An advantage in handling is obtained by the metered addition of the (dissolved) initiator, e.g. dissolved in an aliphatic solvent or in the monomers themselves.

Initially, the mixture can be slightly heated, e.g. to a temperature of approximately 50° C.; then a portion of the dissolved initiator, and after several hours, e.g. 3½ hours, additional initiator is added. It is advantageous that the temperature inside the reactor be kept below 60° C. by cooling. The reaction is continued for several hours, for a total time of e.g. 12 hours. It is advantageous that a stabilizer, e.g. from the class of HALS products, a flame protectant e.g. on phosphorus basis, is added in the standard amounts (cf. Ullmann's Encyclopedia of Industrial Chemistry, 5th Ed. Vol. A20 loc. cit.). The polymer can be obtained by precipitation with methanol or by degassing on an extruder. The polymer exhibits the characteristics of an elastomer.

Macromonomers of Formula I are prepared using any known process. The compounds of Formula I, where R stands for

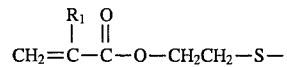

can be obtained e.g. by acylation of the hydroxy group-terminated precursor with (meth)acrylic acid anhydride or (meth)acrylic acid chloride, or by transesterification with (meth)acrylate, preferably using tetraoxotitaniate catalysis. (German Application 41 21 811). The hydroxy group-terminated precursor can be obtained by radical polymerization of methyl methacrylate in the presence of 1–10% by weight of a mercapto alkanol, e.g. 2-mercapto-ethanol.

The production of the transparent composite plate system can be realized in various manners, e.g. by compressing the PMMA plates S and S' between which a layer of elastomers E is positioned. The amount of elastomer is generally such that the intermediate layer Z in the final product will have a thickness from 0.05 to 5 mm. 100 to 3,000 g per $cm^2$ pressure on the surface of one of the plates typically suffices.

The compression may be performed with any suitable press device, e.g. a hydraulic press, usually initiated with heating, e.g. to a temperature of 180° C. The heating time can take more than one hour, e.g. 75 minutes. This is followed by compression, e.g. with a pressure of 50 bar, and cooling to room temperature. With consideration of the rheological conditions—i.e., adaptation of the rheology of elastomer E and PMMA molding mass—the invention composite plate system can also be produced by extrusion. The composite plates obtained according to the invention can be processed in any fashion that PMMA plates are; in particular, they can be sawed and thermally deformed.

The transparent composite plate system of the invention completely fulfills the requirements for transparent glazings. They can be used in manner, e.g. braced, framed, etc. Considered from a safety aspect, they represent a significant advance in the state of the art. Although the composite plates of the invention can be destroyed with a sufficiently forceful impact or shock, there is no splintering off of the fractions. Any created splinters adhere to the intermediate layer Z. As a result, the composite plate systems of the invention, which sometimes are advantageously equipped with a surface treated for scratch resistance, can be used as safety glass, e.g. in buildings and building parts as windows, display windows, doors, room dividers, display cases, railing glass, booth glass and furniture; also, in all types of vehicles, cranes, etc. as windows, doors, instrument glass; in industry for safety covers, also for picture frame glass, optical applications, etc. Of particular interest is their use for glass in the public sector, especially where there is a risk of damage by traffic or vandalism, e.g. in gyms, swimming pools, waiting rooms, telephone booths, overpasses, bridge railing glass, etc. The plates may also be used as noise protection walls.

The following examples are used to explain the invention. Viscosity J (ml/g) is determined according to ISO 1628-6. The examples do not limit the invention.

EXAMPLES

A. Preparation of Elastomers E

A-1:

96 g of macromonomer of Formula I-A (from Example A-2), 224 g of butyl acrylate, and 480 g of butyl acetate are placed under argon into a stirred tank reactor with a protective gas supply, cooling material, and agitation resistance meter and are heated to 51° C.

0.1 g of tert.-butyl-peroxineodecanoate (75% in aliphates) is added as an initiator. After approximately 3½ hours, another 0.2 g of initiator solution are added. The temperature in the reactor is kept below 60° C. by cooling. After a total of 8 hours of polymerization, the polymerization is concluded with the addition of 0.1 g of TINUVIN® 770 Bis-2,2,6,6-Tetramethyl-4-piperidylsebacate in 500 g butyl acetate, and the polymer is isolated by precipitation in 15 l of methanol. Alternatively, the polymer can be isolated by degassing with an extruder. After drying, a clear, elastic, viscous polymer is obtained. J=331 ml/g. The polymer has a tension at break of $\delta_R$=11.5 MPa (tensile test according to DIN 53 455) and a strain at break $\epsilon_R$=433% (according to DIN 53 455).

A-2:

Preparation of the macromonomers of Formula I-A (compound of Formula I, where R stands for

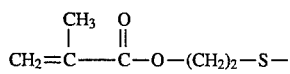

In a 2 l round-bottom four-neck flask with agitator, thermometer, reflux cooler with water separator, and whipping tube for introducing dried air 140 g of the hydroxy-terminated polymethyl methacrylate (J=11.3 ml/g) from A-3 (below) are dissolved together with 1 g of 4-methyl-2,6-di-tert.-butylphenol in 1,000 g of methyl methacrylate and are heated to boiling until no more water is separated. Then 12 ml of isopropyl titanate are added. This is followed by another 3 hours of heating to boiling, cooling to 88° C. Then 20 ml of water are instilled. The generated precipitate is removed from the completely cooled residue by filtration via a pressure filter (filter layer Seitz S 500). The clear, colorless filtrate is concentrated with a rotary evaporator to dryness. The obtained residue is dissolved in 700 ml of acetone, and the macromonomer of Formula I-A is precipitated into 4 l of water. The precipitated material is filtered off and dried in a convection dryer at 60° C.

A-3:

Preparation of the Hydroxy-Terminated Polymethacrylate 200 g of methyl methacrylate are heated in a 2 l reactor with cooling jacket, agitator, reflux cooler, dropping funnels, and thermometer. Argon is introduced to create an inert atmosphere. Once the internal temperature has reached 90° C., 4 g of mercapto-ethanol are added. The polymerization is then initiated with the addition of 0.04 g of t-butylperneodecanoate (75% in aliphates) dissolved in 10 g of methyl methacrylate.

Polymerization begins immediately; the temperature in the reaction container rises from approximately 95° C. to 98° C. within 5 minutes. Once the internal temperature drops again, the following are metered in simultaneously for 4 hours from 2 different dropping funnels:

| | |
|---|---|
| 0.4 g of t-butylperneodecanoate dissolved in | |
| 780.0 g of methyl methacrylate | dropping funnel 1 |
| 16.0 g mercapto-ethanol | dropping funnel 2. |

The temperature in the reactor is hereby maintained in the range from 94° to 98° C. It is then maintained at approximately 96° to 98° C. for 20 minutes.

Then a solution of 0.5 g of t-butylperoxyneodecanoate in 250 g of toluene is metered in for 4 h at 96° to 98° C. (final polymerization). Finally, 0.02 g of TINUVIN® 770 in 250 g of toluene are added for stabilization; cooling to room temperature follows, and the solid is obtained by precipitation in methanol. This results e.g. in 660 g of a colorless, brittle polymer J=11.3 ml/g.

B. Preparation of the Composite Plate System

B-1:

By Compression 60 g of elastomer E from Example A-1 are distributed between two cast, transparent PMMA plates (thickness 5 mm, diameter 120 mm) and heated on a hydraulic press for approximately 75 min to 180° C. They are compressed with 50 bar and cooled to room temperature for approximately 1 h. This results in a composite plate with very good transparency and good adhesion via intermediate layer Z. When the composite plate is destroyed by hammering, the adhesion between the acrylic glass and the intermediate layer, i.e. the cohesion of the system, is preserved, so that the scattering of glass splinters is safely prevented.

What is claimed as new is:

1. A transparent composite plate system comprising at least two parallel acrylic exterior plates S, S' each having a thickness of at least 2 mm, and an intermediate layer comprising a thermoplastically processable elastomer, wherein the elastomer comprises from 60–100% by weight of a comb polymer consisting of from 50 to 5% by weight of at least polymethyl methacrylate macromonomer of Formula I

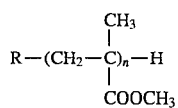 (I)

where R is a radically polymerizable group

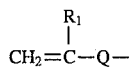 (III)

where $R_1$ is H or —$CH_3$ and O is

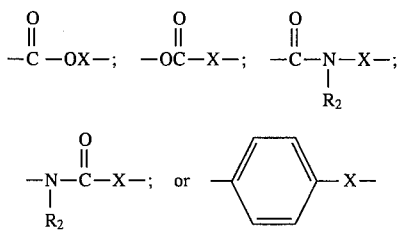

where $R_2$ is H or $C_1$–$C_{24}$ alkyl and X is an alkylene residue with 2 to 24 carbon atoms and n is from 10 to 1000, and from 95 to 50% by weight of at least one alkyl acrylate of Formula II

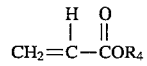

where $R_4$ is an alkyl residue with 2–20 carbon atoms.

2. The transparent composite plate system as claimed in claim 1, wherein the intermediate layer has a thickness of from 0.05 to 5 mm.

3. The transparent composite plate system as claimed in claim 1, wherein $R_4$ is n-butyl, iso-butyl, 2-ethylhexyl or sec-butyl.

4. The transparent plate system as claimed in claim 1, consisting essentially of said acrylic exterior plates and said intermediate layer.

5. The transparent plate system as claimed in claim 1, consisting of said acrylic exterior plates and said intermediate layer.

6. The transparent plate system as claimed in claim 1, wherein said acrylic exterior plates are directly laminated to said intermediate layer.

* * * * *

UNITED STATES PATENT AND TRADEMARK OFFICE
CERTIFICATE OF CORRECTION

PATENT NO. : 5,523,168
DATED : Jun. 4, 1996
INVENTOR(S) : Werner SIOL, et al.

It is certified that error appears in the above-indentified patent and that said Letters Patent is hereby corrected as shown below:

On the title page, in Item [75], the second inventor's name should read:

--Klaus KORALEWSKI--

Signed and Sealed this

Twenty-fourth Day of September, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,523,168
DATED : JUNE 4, 1996
INVENTOR(S) : WERNER SIOL ET AL

It is certified that error appears in the above-identified patent and that said Letters Patent is hereby corrected as shown below:

Column 7, line 13, change "O" to --Q--.

Signed and Sealed this

Ninth Day of June, 1998

Attest:

BRUCE LEHMAN

*Attesting Officer*      *Commissioner of Patents and Trademarks*